United States Patent
Ruden et al.

(10) Patent No.: US 7,757,377 B2
(45) Date of Patent: Jul. 20, 2010

(54) PROCESS FOR ALIGNING A DISC MEMBER ON A ROTATABLE HUB

(75) Inventors: Shawn A. Ruden, Longmont, CO (US); Denis A. Seewald, Mustang, OK (US); Arthur A. Busick, Lexington, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 1206 days.

(21) Appl. No.: 10/743,688

(22) Filed: Dec. 15, 2003

(65) Prior Publication Data

US 2005/0128636 A1  Jun. 16, 2005

(51) Int. Cl.
*G11B 17/02* (2006.01)
(52) U.S. Cl. ............ 29/603.03; 29/603.01; 29/901; 360/98.07; 360/98.01; 360/99.08
(58) Field of Classification Search ............ 29/603.03, 29/603.01, 604, 901, 729, 759, 760; 360/98.07, 360/99.08, 98.01, 99.2, 135, 77.04
See application file for complete search history.

(56) References Cited

U.S. PATENT DOCUMENTS

| | | | |
|---|---|---|---|
| 4,068,267 A * | 1/1978 | Inouye | 360/135 X |
| 4,748,524 A * | 5/1988 | Fukaya et al. | 360/135 |
| 4,933,927 A | 6/1990 | Ross | |
| 5,572,382 A | 11/1996 | Kuno | |
| 5,825,746 A | 10/1998 | Lee | |
| 6,101,876 A | 8/2000 | Brooks et al. | |
| 6,158,112 A | 12/2000 | Kim et al. | |
| 6,237,242 B1 | 5/2001 | Woytassek et al. | |
| 6,421,199 B1 * | 7/2002 | McKenzie et al. | 360/77.04 |
| 6,453,541 B1 | 9/2002 | Guthrie et al. | |
| 6,971,154 B2 * | 12/2005 | Yoo et al. | 29/603.03 |
| 2002/0029667 A1 | 3/2002 | Shiraishi et al. | |
| 2002/0059718 A1 * | 5/2002 | Watanabe et al. | 29/603.03 |

OTHER PUBLICATIONS

Jintanawan, T., "FDB Spindle Motor Design for Vibration Suppression", Digest of the Asia-Pacific Magnetic Recording Conference, 2002, Aug. 2002, pp. WE-P-19-01 to WE-P-19-02.*
S. Ruden, "Plate, Contact, Alternate," Drawing, Seagate Technology LLC, (Jan. 3, 2002), Drawing #D0000002333, Sheet 1 of 1.

(Continued)

*Primary Examiner*—A. Dexter Tugbang
(74) *Attorney, Agent, or Firm*—Fellers, Snider, et al.

(57) ABSTRACT

A biasing tool with a main body portion, for biasing a disc relative to a central axis of rotation of a motor hub by steps for biasing the disc adjacent the motor hub. The biasing tool includes; a first and second biasing finger each having a protruding disc engagement region, each biasing finger extending from the main body portion, and an attachment aperture confined within the main body portion accommodating alignment of the biasing tool relative to the disc. The steps include selectively engaging the disc with a disc engagement region of the first or second biasing finger, and aligning a center of rotation of an annular servo track written on the disc with the central axis of rotation of the motor hub by biasing the disc adjacent the motor hub, which forms a common rotational axis for the motor hub and the annular servo track.

24 Claims, 6 Drawing Sheets

OTHER PUBLICATIONS

S. Ruden, "Plate, Contact, Outside," Drawing, Seagate Technology LLC, (Jun. 16, 2000), Drawing #100106932, Sheet 1 of 1.

S. Ruden, "Plate, Contact, Middle," Drawing, Seagate Technology LLC, (Jun. 16, 2000), Drawing #100106936, Sheet 1 of 1.

* cited by examiner

PROCESS FOR ALIGNING A DISC MEMBER ON A ROTATABLE HUB

FIELD OF THE INVENTION

This invention relates generally to the field of magnetic data storage devices, and more particularly, but not by way of limitation, to a disc biasing tool with a split-finger biasing tool for biasing a disc relative to a central axis of a motor hub of a data storage device.

BACKGROUND

A key component of a computer system is a device, (such as a data storage device DSD) to store data. The most basic parts of a DSD includes an information storage disc (disc) that is rotated, an actuator that moves a read/write head (head) to various locations over data tracks of the disc, and electrical circuitry used for encoding data so that the data can be successfully retrieved and written to the disc surface. Servo tracks are provided on the disc surface to foster positional control of the head relative to the disc surface during data exchange operations. A microprocessor controls most of the operations of the DSD including exchanging data between the computer system and the DSD.

Among the challenges associated with data storage device assembly processes are; cost effective techniques for attaining a substantial coexistence between an axis of rotation of a motor hub rotating the disc, assuring a center of rotation for the servo tracks, and minimizing imbalanced rotation of the disc. Improved control over imbalanced rotation of the disc and substantial attainment of the coexistence between the rotational center of the servo tracks and the axis of rotation of a motor hub enhances attainment of increased storage capacity of the DSD.

As such, challenges remain and a need persists for cost effective techniques for rotational balance control and substantial coexistence between an axis of rotation of a motor hub and a center of rotation for the servo tracks of a DSD.

SUMMARY OF THE INVENTION

In accordance with preferred embodiments, a disc member is provided with an annular track having a track center offset a center of the disc member. A biasing tool with at least one flexible, cantilevered finger imparts a bias force to the disc member to align the track center with a central axis of a rotatable hub.

In one embodiment, the biasing apparatus preferably has a biasing tool with a main body portion, at least a first and second biasing finger wherein each biasing finger has a proximal end and extends from the main body portion. The biasing tool further preferentially includes a disc engagement region protruding from a distal end of each biasing finger and an attachment aperture confined within the main body portion, for accommodating alignment of each disc alignment region relative to the disc.

In another embodiment of the present invention, the preferred steps of the method includes: providing the motor hub supporting a disc having an annular servo track with a center of rotation written on the disc offset from a central axis of rotation of the motor hub; aligning a biasing tool (preferably having at least a first and second biasing finger) adjacent the disc; and selecting a disc engagement region of one of the biasing fingers for engagement with the disc.

The preferred method steps continue with imparting a bias force on the disc with the selected engagement region, which aligns the center of rotation of the annular servo track with the central axis of rotation of the motor forming a common rotational axis, for the motor hub and the annular servo track.

A further embodiment of the present invention includes a data storage device preferably comprising, a disc biased adjacent a motor hub by the biasing apparatus executing the preferred steps of the method.

These and various other features and advantages that characterize the claimed invention will be apparent upon reading the following detailed description and upon review of the associated drawings.

DETAILED DESCRIPTION

Figure 1:
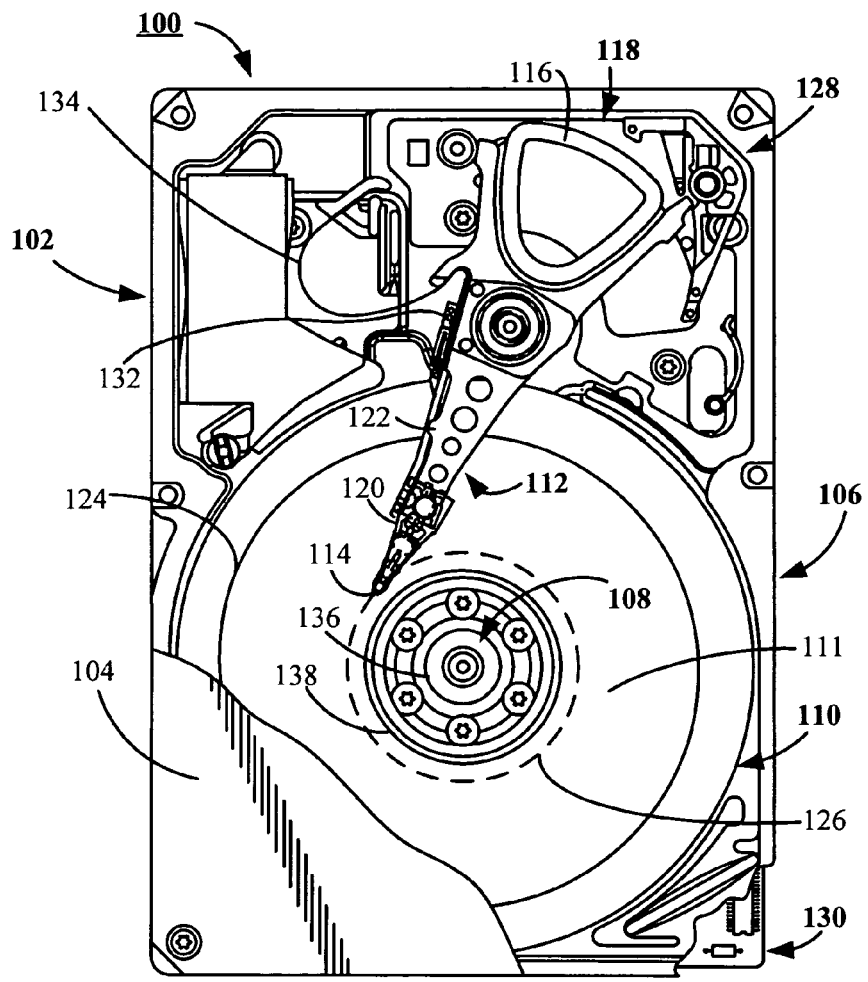
FIG. 1 is a partial cut-away top plan view of a data storage device (DSD) with a disc aligned to a motor hub of the DSD by a preferred embodiment of a biasing apparatus of the present invention.

Referring now to the drawings, FIG. 1 provides a top plan view of a data storage device (DSD) 100. The DSD 100 includes a base deck 102 cooperating with a top cover 104 (shown in partial cut-away) to form a sealed housing for a mechanical portion of the DSD 100, referred to as a head-disc assembly (HDA) 106.

A spindle motor assembly (motor) 108 rotates a number of data storage discs (disc) 110 with a magnetic recording surface (surfaces) 111 at a substantially constant operational speed. An actuator assembly (actuator) 112 supports and rotates a number of read/write heads (heads) 114 into a data exchange relationship adjacent the surfaces 111, when current is applied to a coil 116 of a voice coil motor (VCM) 118. A head suspension 120 provides a predetermined spring force on the head 114 to maintain the proper data exchange relationship between the head 114 and the disc 110 during operation of the DSD 100. Additionally, the head suspension 120 serves to connect the head 114 with an actuator arm 122 of the actuator 112.

During operation of the DSD 100, the actuator 112 moves the heads 114 into the data exchange relationship with the disc 110, i.e., the actuator 112 moves the heads to data tracks 124 on the surfaces 111 to write data to and read data from the disc 110. When the DSD 100 is deactivated, the actuator 112 positions the heads 114 adjacent a home position 126, and the actuator 112 is confined by latching a toggle latch 128.

Command, control, and interface electronics for the DSD 100 are provided on a printed circuit board assembly 130 mounted to the HDA 106. During data transfer operations, a preamplifier/driver (preamp) 132 attached to a flex circuit 134 conditions read/write signals conducted by the flex circuit 134 between the printed circuit board assembly 130 and the heads 114.

In a preferred embodiment, the disc 110 is clamped adjacent a motor hub 136 of the motor 108 by a disc clamp 138. The disc clamp 138 assures that the disc 110 remains in a fixed position, relative to the motor hub 136, while the motor 108 rotates the motor hub 136 during operation of the DSD 100. Additionally, the disc 110 in a preferred embodiment is biased adjacent the motor hub 136, in a predetermined direction, just prior to completing installation of the disc clamp 138 onto the motor hub 136. In a preferred embodiment, biasing the disc 110 adjacent the motor hub 136, aligns a plurality of annular servo tracks (not shown) written on the disc 110.

Figure 2:
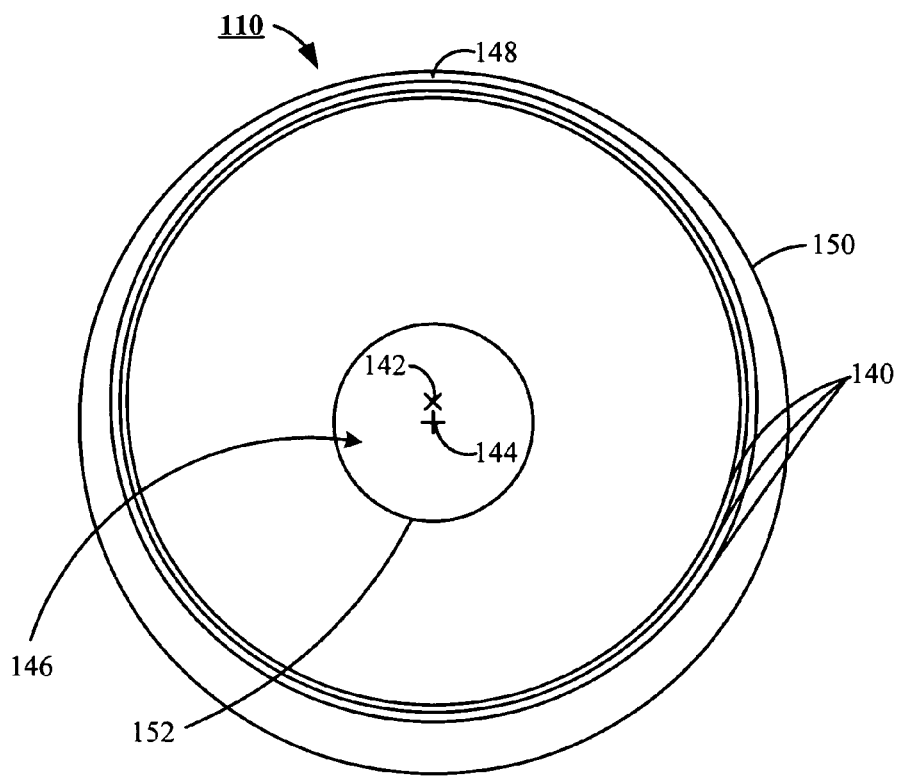
FIG. 2 is a top plan view of a plurality of annular servo tracks written on the disc of FIG. 1.

FIG. 2 shows a preferred embodiment of the plurality of annular servo tracks 140; having a center of rotation 142 offset from a rotational center 144 of the disc 110. The center of rotation 142 of the plurality of annular servo tracks 140 is confined within a mounting aperture 146 of the disc 110, and aligning between the rotational center 144 of the disc 110 in an index feature 148. The index feature 148 is adjacent an outer diameter 150 of the disc 110, and the mounting aperture 146 is confined within an inner diameter 152 of the disc 110.

Figure 3:
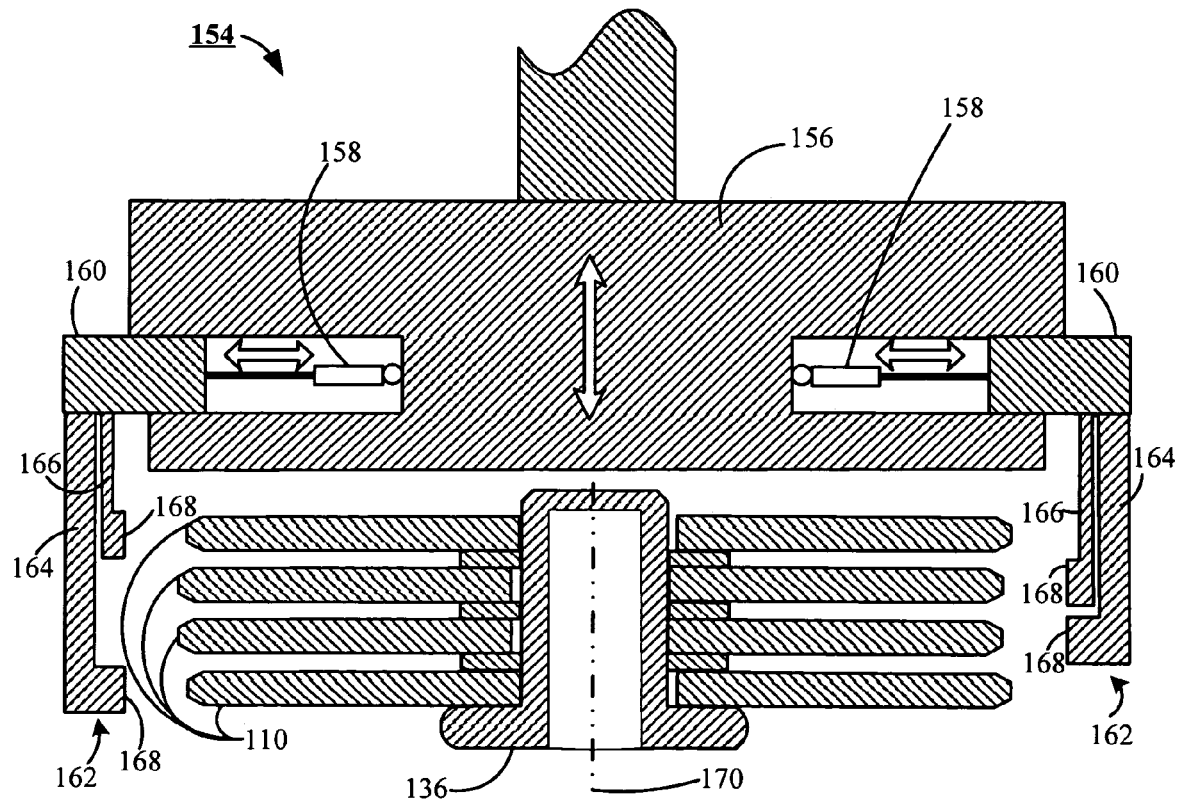
FIG. 3 is a partial cut-away, cross-sectional elevational view of the preferred embodiment of the biasing apparatus of the present invention.

FIG. 3 shows a preferred embodiment of a biasing apparatus 154 of the present invention having a biasing tool support structure 156. The biasing apparatus 154 provides a plurality of motion generating means 158. In a preferred embodiment, the plurality of motion generating means 158 are flow controlled pneumatic cylinders. However, one skilled in the art will readily recognize; the motion provided by the plurality of motion generating means 158 may be accomplished by a number of alternate devices such as linear motors, worm gears, rack and pinion arrangements, stepper motors, or any alternate motion generating device.

Preferably, each of the plurality of motion generating means 158 is attached to a pusher block 160, in which the pusher block 160 supports a biasing tool 162 (also referred to herein as a "split-finger" biasing tool 162). Each biasing tool 162 provides at least two biasing fingers such as 164 and 166 with a disc engagement region 168.

In a preferred embodiment, the biasing tool support structure 156 is raised or lowered, relative to the motor hub 136 supporting the plurality of discs 110, to position each disc engagement region 168 of the biasing tool 162 relative to a corresponding disc of the plurality of discs 110, and one of the plurality of motion generating means 158 operates to engage or disengage the disc engagement region 168, with which a disc of the plurality of discs 110 corresponds.

Preferentially, each biasing finger, such as 164 or 166, independently interact with its corresponding disc of the plurality of discs 110, to assure each disc of the plurality of discs 110 responds only to the disc engagement region 168 of one of the biasing fingers, such as 164 or 166. Each biasing finger of the plurality of biasing fingers, such as 164 or 166, corresponding to each one of the plurality of discs 110, isolates interaction between the discs 110, which are simultaneously responding to an interaction with their corresponding biasing finger.

In other words, when biasing each disc of the plurality of discs 110, each disc 110 is individually biased, and a simultaneous biasing of the other discs of the plurality of discs 110 does not influence the individual behavior of any of the discs 110.

If a biasing tool provides only one biasing finger, such as 164 or 166, but includes at least two disc engagement regions 168, attainment of properly biased discs 110 may be difficult, due to variability between the discs 110. Variability of either the outer diameter 150 or the inner diameter 152 (both of FIG. 2), or both, may lead to non-attainment of properly biased discs 110. For example, a mismatch in outer diameters 150 of a number of discs of the plurality of discs 110 may lead to discs among the plurality of discs 110 with smaller diameters failing to be displaced by a sufficient amount to attain a complete biasing. Therefore, failing to align the center of rotation 142 (of FIG. 2) of the plurality of annular servo tracks 140 (of FIG. 2) with a central axis of rotation 170 of the motor hub 136 to form a common rotational axis, performance requirements of the DSD 100 (of FIG. 1) may be unattained, or a substantial offsetting of rotational imbalance of the discs 110 of the DSD 100 may not be achieved.

By biasing each of the plurality of discs 110 in a predetermined direction, rotational imbalance of the discs of the DSD 100 is significantly reduced, and in a number of instances, the rotational imbalance is eliminated. For example, for a DSD 100 with a pair of discs 110, each of the pair of discs 110 is biased along a common line, but biased in opposing directions toward the central axis of rotation 170 of the motor hub 136. For a DSD 100 with three discs 110, the predetermined direction for biasing each disc 110 is toward the central axis of rotation 170 of the motor hub 136, but rather than the bias force being applied to each disc 110 along a common line, the bias force is applied along lines separated by 120 degrees.

Figure 4:
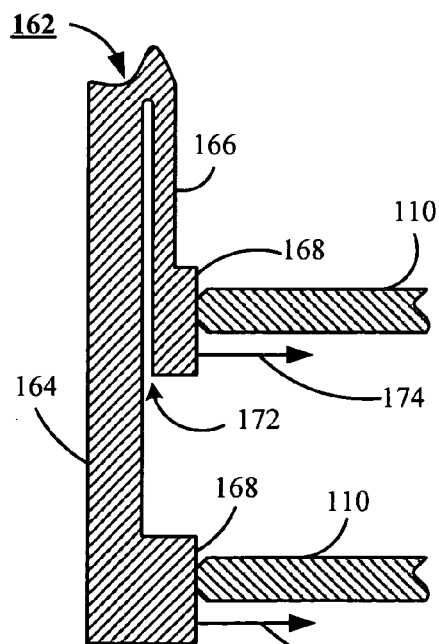
FIG. 4 is a partial cut-away, cross-sectional elevational view of a biasing tool of the biasing apparatus of FIG. 3.

FIG. 4 shows a bias finger flex aperture 172 provided by the biasing tool 162, which defines the biasing tool 162 as a split-finger biasing tool 162. The biasing finger flex aperture 172 accommodates slight dimensional variations between each of the plurality of discs 110 during a biasing procedure. It will be noted that the dimensions of the biasing finger 164 is different than the biasing finger 166. The dimensions of the biasing finger 164 and the biasing finger 166 are selected to meet attainment of a common predetermined bias force, as illustrated by a force vector 174. The bias force is specific to both the configuration of a DSD and the process selected for producing that particular DSD. The dimensional characteristics of the biasing finger flex aperture 172 is determined by an amount of flex each biasing finger of the biasing tool 162 undergoes, to assure that only the predetermined bias force illustrated by the force vector 174 is imparted on each disc 110 during the biasing procedure, and to preclude interaction between the biasing fingers 164 and 166.

FIGS. 5, 6, 7, and 8 are preferably viewed together. Collectively, FIGS. 5, 6, 7, and 8 illustrate one of the plurality of biasing tools 162 of the biasing apparatus 154 (of FIG. 3). The biasing tool (collectively illustrated by FIGS. 5, 6, 7, and 8) is configured to accommodate a top disc and a bottom disc of a four disc stack of a HDA (such as HDA 106 of FIG. 1).

Figure 5:
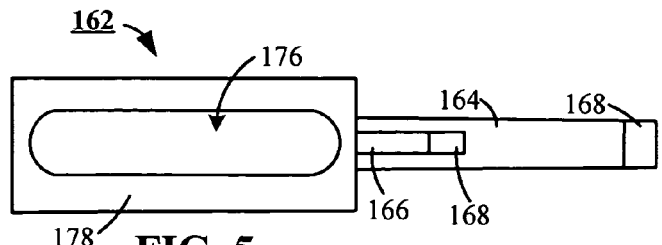
FIG. 5 is a top plan view of a preferred embodiment of the biasing tool of FIG. 4.
Figure 7:
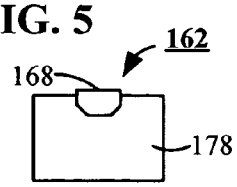
FIG. 7 is an end elevational view of the preferred embodiment of the biasing tool of FIG. 5.
Figure 6:
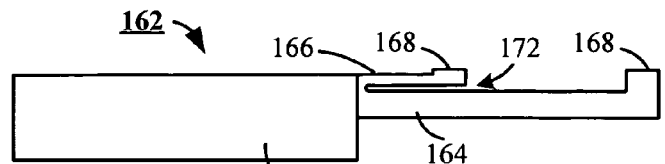
FIG. 6 is a side elevational view of the preferred embodiment of the biasing tool of FIG. 5.
Figure 8:
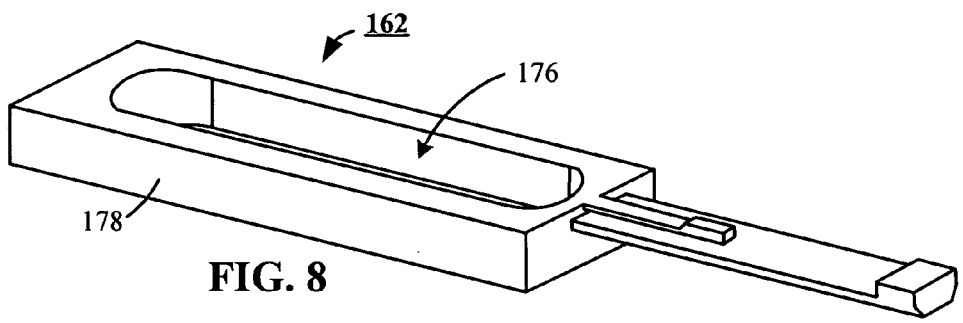
FIG. 8 is a perspective view of the preferred embodiment of the biasing tool of FIG. 5.
Figure 9:
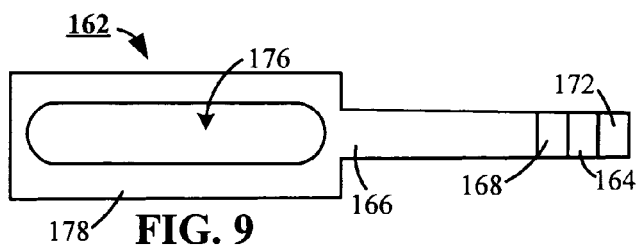
FIG. 9 is a top plan view of an alternate preferred embodiment of the biasing tool of FIG. 4.
Figure 11:
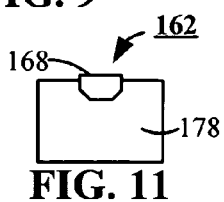
FIG. 11 is an end elevational view of the alternate preferred embodiment of the biasing tool of FIG. 9.
Figure 10:
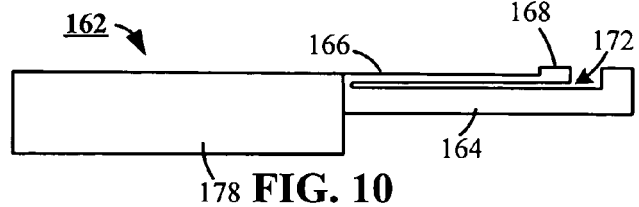
FIG. 10 is a side elevational view of the alternate preferred embodiment of the biasing tool of FIG. 9.
Figure 12:
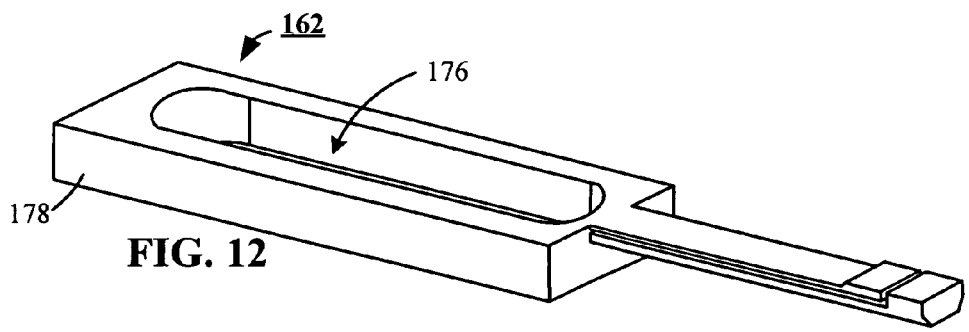
FIG. 12 is a perspective view of the alternate preferred embodiment of the biasing tool of FIG. 9.
Figure 13:
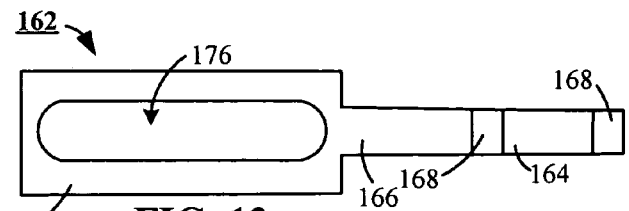
FIG. 13 is a top plan view of another preferred embodiment of the biasing tool of FIG. 4.
Figure 15:
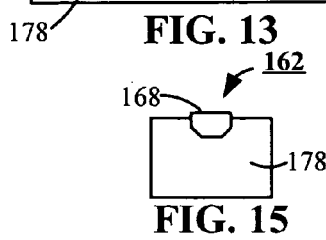
FIG. 15 is an end elevational view of the preferred embodiment of the biasing tool of FIG. 13.
Figure 14:
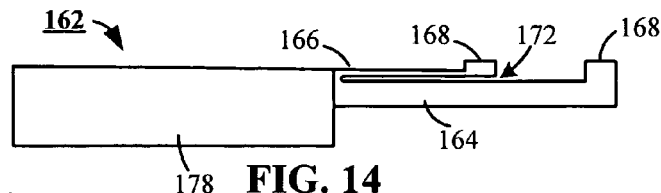
FIG. 14 is a side elevational view of the preferred embodiment of the biasing tool of FIG. 13.
Figure 16:
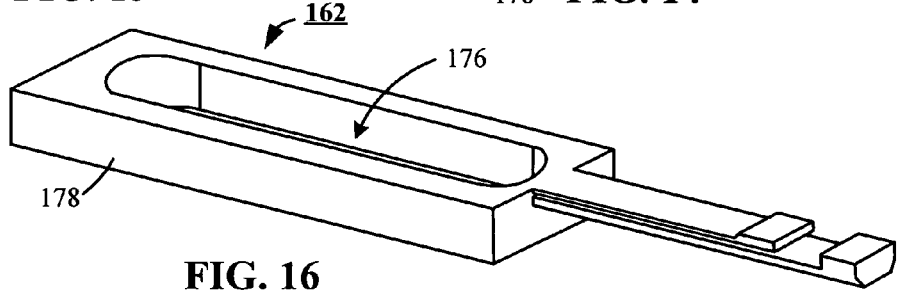
FIG. 16 is a perspective view of the preferred embodiment of the biasing tool of FIG. 13.

FIG. 5 shows an attachment aperture 176 confined by a main body portion 178 of the biasing tool 162. The attachment aperture 176 accommodates alignment of each disc alignment region of the biasing tool 162 with the disc 110 (of FIG. 1) of the HDA 106, with which the disc 110 corresponds.

FIGS. 9, 10, 11, and 12 are preferably viewed together. Collectively, FIGS. 9, 10, 11, and 12 illustrate another of the plurality of biasing tools 162 of the biasing apparatus 154 (of FIG. 3). The biasing tool 162 (collectively illustrated by FIGS. 9, 10, 11, and 12) is configured to accommodate any two adjacent discs of a disc stack of a HDA (such as HDA 106 of FIG. 1).

FIGS. 13, 14, 15, and 16 are preferably viewed together. Collectively, FIGS. 13, 14, 15, and 16 illustrate yet another of the plurality of biasing tools 162 of the biasing apparatus 154 (of FIG. 3). The biasing tool 162 (collectively illustrated by FIGS. 13, 14, 15, and 16) is configured to accommodate an outer two of any three adjacent discs of a disc stack of a HDA (such as HDA 106 of FIG. 1).

It will be noted, that any configuration of the biasing tool 162 may be adjusted to accommodate a disc of a HDA (such as HDA 106 of FIG. 1) consisting of a single disc. For data storage devices (such as DSD 100 of FIG. 1) that utilize a single disc 110 that incorporates the plurality of annular servo tracks 140 having their center of rotation 142 offset from the rotational center 144 of the disc 110 (as shown by FIG. 3), biasing the single disc 110 is a preferential process for the HDA 106 to undergo.

Figure 17:
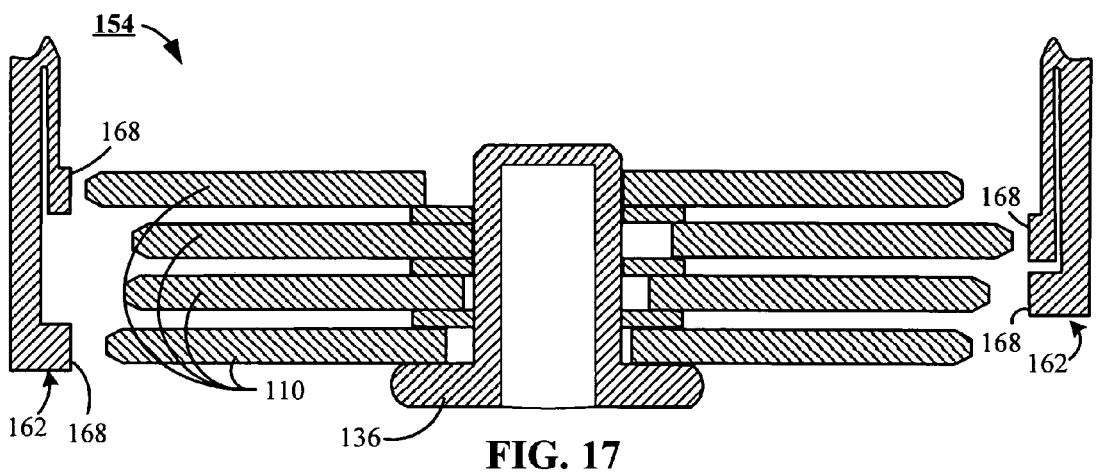
FIG. 17 is a partial cut-away, cross-sectional elevational view of the biasing tools of the biasing apparatus of FIG. 3 prior to interaction with each disc of FIG. 1.

FIGS. 17, 18, 19, 20, and 21 are advantageously viewed together. Each of the FIGS. 17, 18, 19, 20, and 21 are illustrative of a step in the biasing process. FIG. 17 shows the alignment of each of the disc engagement regions 168 with a disc of the plurality of discs 110 with which they correspond.

Figure 18:
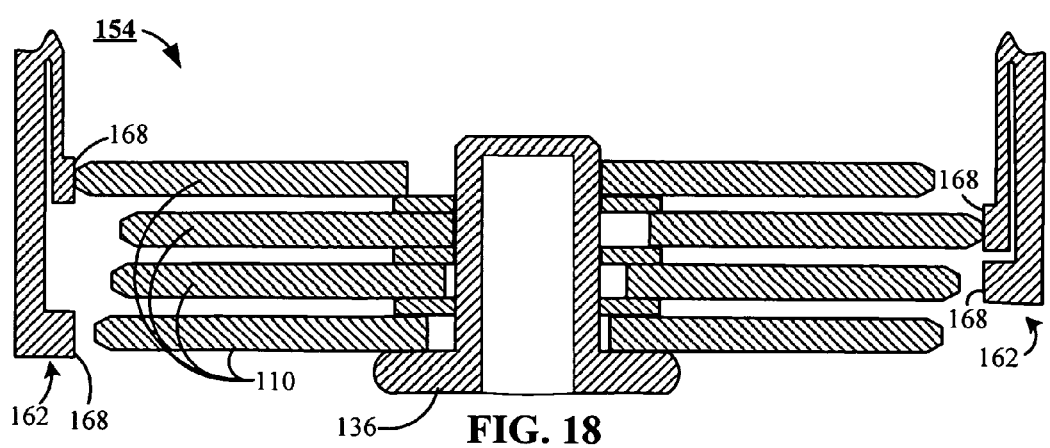
FIG. 18 is a partial cut-away, cross-sectional elevational view of the biasing tools of the biasing apparatus of FIG. 3 engaging discs of FIG. 1.

FIG. 18 shows a first engagement of a number of the discs 110 of the plurality of discs 110, by a number of the disc engagement regions 168, during the biasing process.

Figure 19:
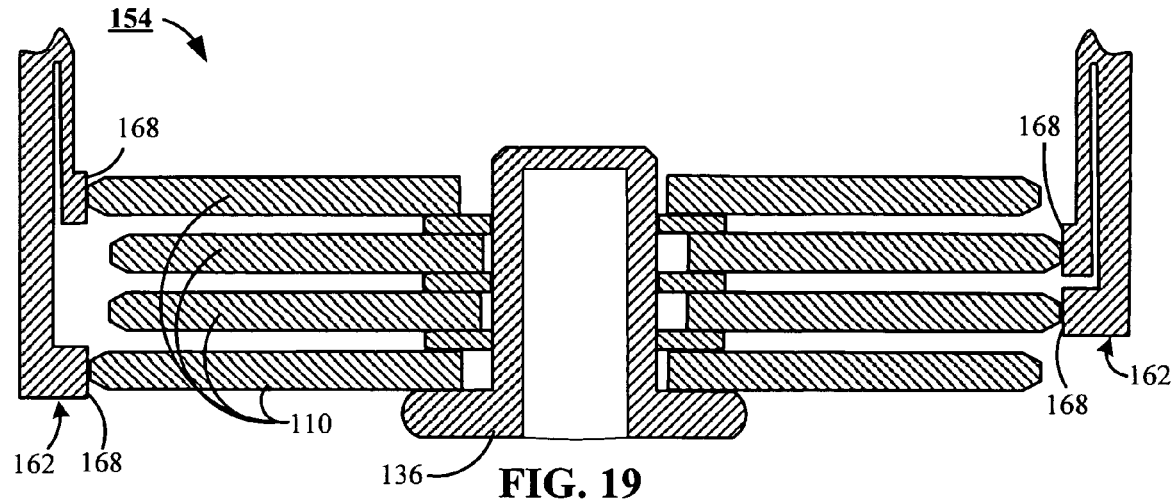
FIG. 19 is a partial cut-away, cross-sectional elevational view of the biasing tools of the biasing apparatus of FIG. 3 engaging all discs of FIG. 1.

FIG. 19 shows engagement of the remaining discs 110 of the plurality of discs 110, with the remaining disc engagement regions 168, during the biasing process.

Figure 20:
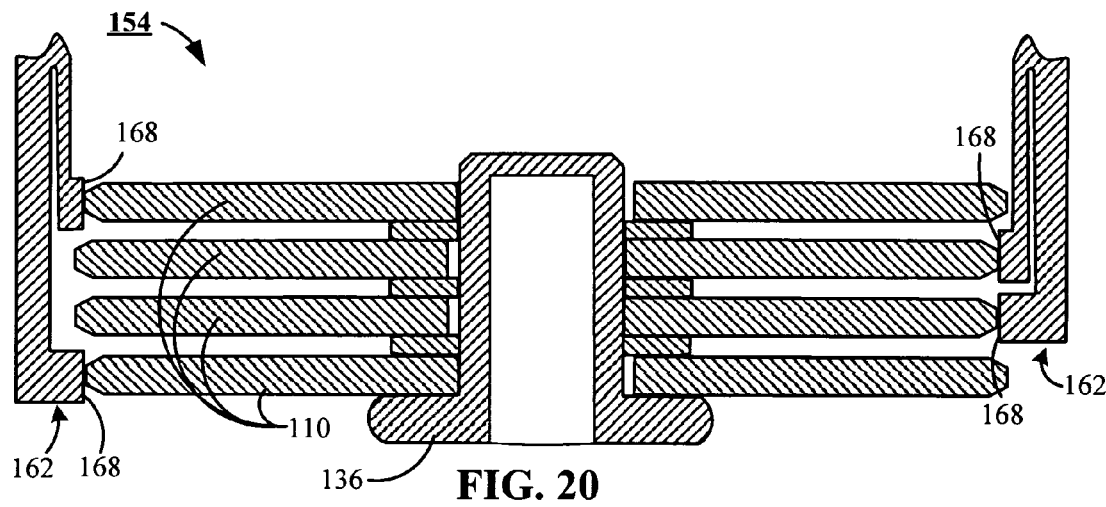
FIG. 20 is a partial cut-away, cross-sectional elevational view of the biasing tools of the biasing apparatus of FIG. 3 aligning all discs of FIG. 1.

FIG. 20 shows the position of each disc of the plurality of discs 110 resulting from the final position of each disc engagement region 168, during the biasing process.

Figure 21:
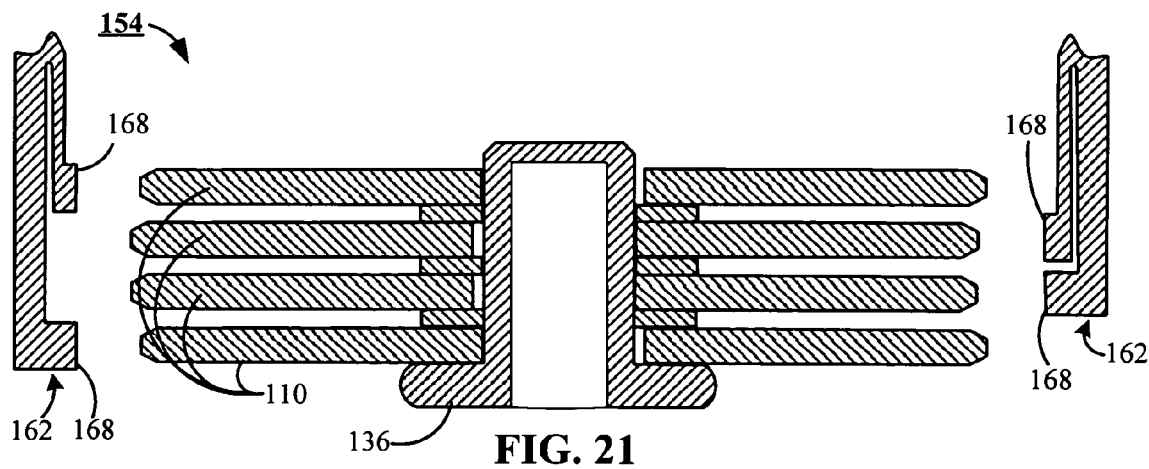
FIG. 21 is a partial cut-away, cross-sectional elevational view of the biasing tools of the biasing apparatus of FIG. 3, disengaging from all discs of FIG. 1, post alignment of all discs of FIG. 1.

FIG. 21 shows disengagement of each of the disc engagement regions 168 from engagement with each of the plurality of discs 110, and the biasing tools 162 awaiting extraction by the biasing apparatus 154 from alignment with the plurality of discs 110.

Figure 22:
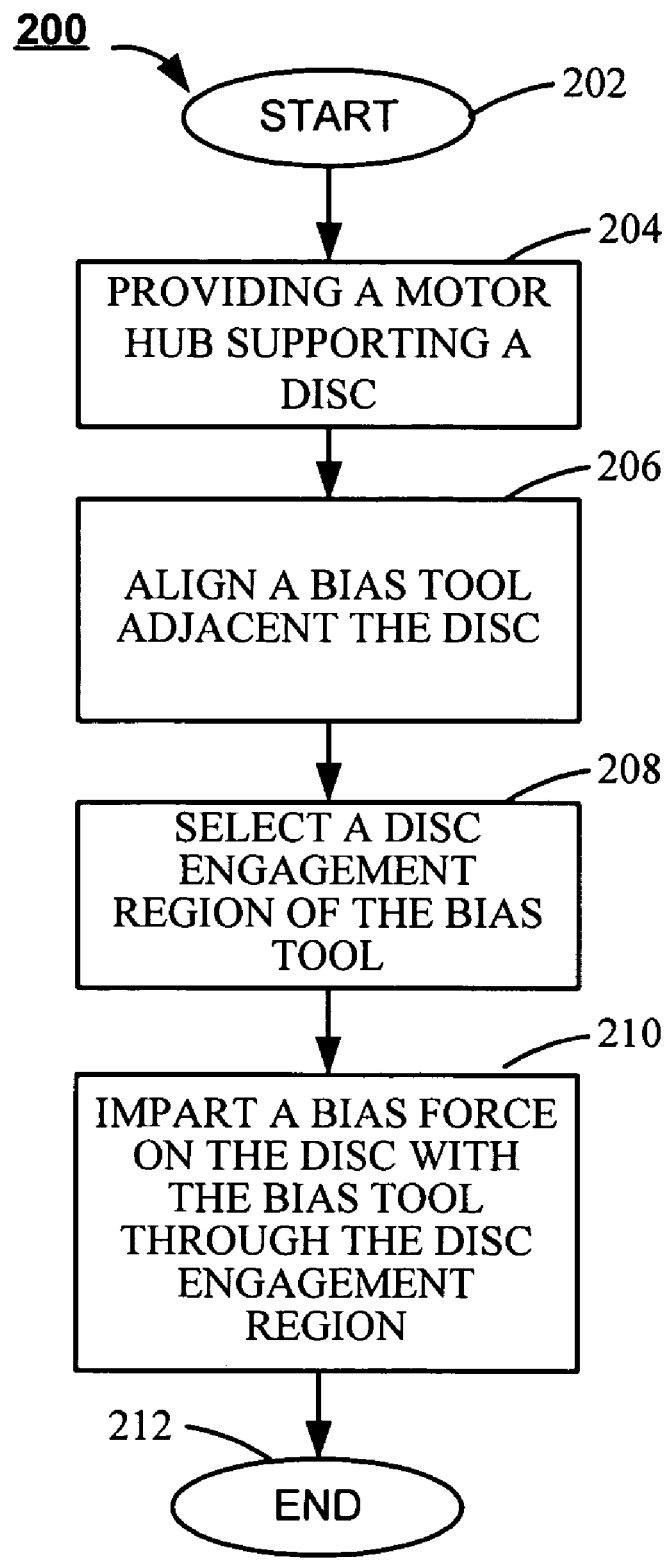
FIG. 22 is a flowchart of preferred method steps for aligning the disc of FIG. 1 to the motor hub of FIG. 1.

FIG. 22 shows a preferred biasing method 200 for biasing a disc (such as 110) adjacent a motor hub (such as 136) beginning at start step 202 and continuing at process step 204. At process step 204, the motor hub with a central axis of rotation (such as 170) supporting the disc is provided. The disc preferentially includes an annular servo track (such as 140) with a center of rotation (such as 142) offset from the central axis of rotation of the motor hub.

At process step 206, a biasing tool (such as 162) preferentially provides at least a first biasing finger (such as 164) and a second biasing finger (such as 166), which is aligned adjacent the disc. At process step 208, a disc engagement region (such as 168) of one of the plurality of biasing fingers is selected for engagement with the disc.

The preferred biasing method 200, preferentially continues at process step 210 with a bias force (such as illustrated by force vector 174) imparted on the disc with the selected engagement region. The bias force aligns the center of rotation of the annular servo track with the central axis of rotation of the motor, thereby forming a common rotational axis for the motor hub and the annular servo track. The preferred biasing method 200 concludes at end process step 212.

Accordingly, in preferred embodiments, the present invention is directed to a biasing apparatus (such as 154), a method (such as 200) of biasing a disc (such as 110) adjacent a motor hub (such as 136), and a data storage device (such as 100) that includes the disc biased adjacent the motor hub by means for biasing a disc adjacent a motor hub, using steps for biasing a disc adjacent a motor hub.

In accordance with preferred embodiments, a method, apparatus, and combination are provided for aligning an annular servo track (such as 140) with a center of rotation (such as 142) offset from a central axis of rotation (such as 170) of a motor hub by biasing the disc (upon which the annular servo track is written) adjacent the motor hub. Alignment of the center of rotation of the annular servo track with the central axis of rotation of the motor hub forms a common rotational axis for the motor hub and the annular servo track, along with substantially offsetting a rotational imbalance of the discs for data storage devices having a plurality of discs.

The biasing apparatus preferably has a biasing tool (such as 162) with a main body portion (such as 178), at least a first and second biasing finger (such as 164, 166), wherein each biasing finger has a proximal end and extends from the main body portion. The biasing tool further preferentially includes a disc engagement region (such as 168) protruding from a distal end of each biasing finger, and an attachment aperture (such as 176) confined within the main body portion accommodates alignment of each disc alignment region relative to the disc.

The preferred steps of the method included: providing the motor hub, supporting a disc having an annular servo track with a center of rotation written on the disc, offset from a central axis of rotation of the motor hub (such as shown by process step 204); aligning a biasing tool preferably having at least a first and second biasing finger adjacent the disc (such as shown by process step 206); and selecting a disc engagement region of one of the plurality of biasing fingers for engagement with the disc (such as shown by process step 208).

The preferred method steps continue with imparting a bias force (such as illustrated by force vector 174) on the disc with the selected engagement region, which aligns the center of rotation of the annular servo track with the central axis of rotation of the motor forming a common rotational axis, for the motor hub and the annular servo track.

The present invention further includes the data storage device preferably comprising the disc biased adjacent the motor hub by the biasing apparatus executing the preferred steps of the method.

It is to be understood that even though numerous characteristics and advantages of various embodiments of the present invention haven't been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the biasing apparatus with a split-finger biasing tool, while maintaining substantially the same functionality without departing from the scope and spirit of the present invention. In addition, although the preferred embodiment described herein is directed to a biasing apparatus with a split-finger biasing tool for a data storage device, it will be appreciated by those skilled in the art that the teachings of the present invention can be applied to other systems without departing from the scope and spirit of the present invention.

What is claimed is:

1. A method comprising:
   providing a hub with a central axis, the hub supporting a disc member having an annular track with a center of rotation offset from the central axis; and
   imparting a bias force on the disc member to align the center of rotation of the track with the central axis of the hub by contactingly engaging the disc member with a flexible cantilevered finger of a biasing tool to bring an innermost surface of a central mounting aperture of the disc into contact with an outer cylindrical surface of the hub, wherein the center of rotation of the track is axially aligned with the central axis of the hub during said contact of the innermost surface of the central mounting aperture of the disc with the outer cylindrical surface of the hub, thereby forming a common rotational axis for the central axis of the hub and a central axis of the center of rotation of the track.

2. The method of claim 1, wherein the disc member is characterized as a first disc member, wherein the bias force is characterized as a first bias force which is imparted upon the first disc member using the flexible cantilevered finger as a first finger of the biasing tool, and wherein the imparting step further comprises concurrently imparting a second bias force on a second disc member using a second finger of the biasing tool, the second bias force aligning a center of rotation of a second annular track on the second disc member with the central axis of the hub.

3. The method of claim 2, wherein the biasing tool comprises a main body portion from which the first and second fingers respectively extend, and wherein the imparting step comprises advancing the main body portion toward the central axis of the hub while independently deflecting the first and second fingers against the respective first and second disc members.

4. The method of claim 2, wherein the biasing tool comprises a first main body portion from which the first finger extends and a second main body portion from which the second finger extends, and wherein the imparting step comprises concurrently advancing the first and second main body portions in opposing directions toward the central axis of the hub to independently deflect the first and second members against the respective first and second disc members.

5. The method of claim 1, wherein the imparting step comprises deflecting the flexible cantilevered finger against a peripheral outer sidewall of the disc member to slidingly advance the disc member until an interior sidewall of the disc member contactingly abuts the hub.

6. The method of claim 5, wherein the flexible cantilevered finger extends from a main body portion of the biasing tool, and wherein the main body is advanced in a selected direction during the deflecting step and continues to advance in the selected direction after the interior sidewall of the disc member contactingly abuts the hub.

7. The method of claim 1, wherein the flexible cantilevered finger comprises a proximal end which extends from a main body portion in a first direction and a disc engagement region which extends from a distal end of the flexible cantilevered finger in a second direction, the disc engagement region configured to contactingly engage a surface of the disc member.

8. The method of claim 7, wherein the first direction is substantially parallel with the central axis of the hub and the second direction is substantially normal to the central axis of the hub.

9. The method of claim 1, wherein the disc member of the providing step comprises an optically detectable index mark which identifies a location at which said center of rotation offset has a maximum value, and wherein the imparting step comprises contactingly engaging the disc member along a line that substantially passes through the index mark and the central axis of the hub.

10. The method of claim 1, wherein the hub of the providing step further supports a plurality of said disc members, and wherein the imparting step comprises advancing a first biasing tool, comprising the flexible cantilevered finger as a first flexible finger and a second flexible cantilevered finger, toward the central axis of the hub in a first direction so that said first and second flexible cantilevered fingers contactingly advance an upper and a lower disc member, respectively, and advancing a second biasing tool comprising a third flexible cantilevered finger toward the central axis of the hub in a second opposing direction so that said third flexible cantilevered finger contactingly advances an intermediate disc member between the upper and lower disc members.

11. The method of claim 1, wherein the imparting step follows the providing step, and wherein the method further comprises a subsequent step of applying a clamp to the disc member to retain said alignment of the center of rotation of the track with the central axis of the hub.

12. The method of claim 1, wherein the center of rotation of the annular track of the disc member is offset from the central axis of the hub by a predetermined value, wherein the bias force forms a common rotational axis for the central axis of hub and the center of rotation of the track by displacing the disc member by the predetermined value.

13. A method comprising:
   providing a disc member with an annular track having a track center offset from a center of the disc member; and
   contactingly engaging a distal end of a cantilevered finger of a biasing tool against the disc member to impart a bias force which aligns the track center with a central axis of a rotatable hub by bringing an innermost surface of a central mounting aperture of the disc into contact with an outer cylindrical surface of the rotatable hub, wherein the track center is axially aligned with the central axis of the rotatable hub during said contact of the innermost surface of the central mounting aperture of the disc with the outer cylindrical surface of the hub, thereby forming a common rotational axis for the central axis of the rotatable hub and the track center.

14. The method of claim 13, wherein the disc member is characterized as a first disc, and wherein the method further comprises concurrently imparting a second bias force on a second disc member using a distal end of a second finger of the biasing tool, the second bias force aligning a center of rotation of a second annular track on the second disc with the central axis of the rotatable hub.

15. The method of claim 14, wherein the biasing tool comprises a main body portion from which the first and second fingers respectively extend, and wherein the main body portion is advanced toward the central axis of the rotatable hub while independently deflecting the first and second biasing members against the respective first and second disc members.

16. The method of claim 14, wherein the biasing tool comprises a first main body portion from which the cantilevered finger extends and a second main body portion from which the second finger extends, and wherein the first and second main body portions are concurrently advanced in opposing directions toward the central axis of the rotatable to independently deflect the cantilevered finger and second finger against the respective first and second discs.

17. The method of claim 13, wherein the cantilevered finger contactingly abuts a peripheral outer sidewall of the disc member to slidingly advance the disc member until an interior sidewall of the disc member contactingly abuts the rotatable hub.

18. The method of claim 17, wherein the cantilevered finger extends from a main body portion of the biasing tool, and wherein the main body portion is advanced in a selected direction during the contactingly engaging step and continues to advance in the selected direction after the interior sidewall of the disc member contactingly abuts the rotatable hub.

19. The method of claim 13, wherein the cantilevered finger comprises a proximal end which extends from a main body portion in a first direction and a disc engagement region which extends from the distal end of the finger in a second direction, the disc engagement region configured to contactingly engage a surface of the disc member.

20. The method of claim 13, wherein the disc member of the providing step comprises an optically detectable index mark which identifies a location at which said track center offset has a maximum value, and wherein the disc member is contactingly engaged by the distal end of the cantilevered finger along a line that substantially passes through the index mark and the central axis of the rotatable hub.

21. The method of claim 13, wherein the rotatable hub of the providing step further supports a plurality of said disc members, and wherein the imparting step comprises advancing a first biasing tool, comprising the cantilevered finger as a first flexible cantilevered finger and a second flexible cantilevered finger, toward the central axis in a first direction so that said first and second fingers contactingly advance an upper and a lower disc member, respectively, and advancing a second biasing tool comprising a third flexible cantilevered finger toward the central axis of the rotatable hub in a second opposing direction so that said third flexible cantilevered finger contactingly advances an intermediate disc member between the upper and lower disc members.

22. The method of claim 13, wherein the providing step comprises providing an even number of said disc members, and wherein the contactingly engaging step comprises advancing a first half of said disc members into contacting abutment with the rotatable hub from a first direction and concurrently advancing a second half of said disc members into contacting abutment with the rotatable hub from an opposing second direction so that an offset annular track on each said disc member is substantially aligned into a cylinder at the same nominal radius from the central axis of the rotatable hub.

23. The method of claim 13, further comprising a subsequent step of applying a clamp to the disc member to retain said alignment of the track center with the hub central axis of the hub.

24. The method of claim 13, wherein a center of rotation of the annular track of the disc member is offset from the central axis of the rotatable hub by a predetermined value, wherein the bias force forms a common rotational axis for the center of rotation of the hub and the center of rotation of the annular track by displacing the disc member by the predetermined value.

\* \* \* \* \*

UNITED STATES PATENT AND TRADEMARK OFFICE
CERTIFICATE OF CORRECTION

PATENT NO.        : 7,757,377 B2                                              Page 1 of 1
APPLICATION NO.   : 10/743688
DATED             : July 20, 2010
INVENTOR(S)       : Shawn A. Ruden et al.

It is certified that error appears in the above-identified patent and that said Letters Patent is hereby corrected as shown below:

In Col. 1, line 45
replace "a center of"
with "from a center of."

In Col. 10, line 30
replace "with the hub central axis"
with "with the central axis."

Signed and Sealed this

Twenty-eighth Day of September, 2010

David J. Kappos
*Director of the United States Patent and Trademark Office*